(12) United States Patent
Murakami et al.

(10) Patent No.: US 6,191,826 B1
(45) Date of Patent: Feb. 20, 2001

(54) PROJECTOR APPARATUS

(75) Inventors: Kyoichi Murakami; Hiroaki Endo; Hiroshi Murayama, all of Kanagawa; Atsushi Iwamura, Tokyo, all of (JP)

(73) Assignee: Sony Corporation, Tokyo (JP)

( * ) Notice: Under 35 U.S.C. 154(b), the term of this patent shall be extended for 0 days.

(21) Appl. No.: 08/974,544

(22) Filed: Nov. 19, 1997

(30) Foreign Application Priority Data

Nov. 19, 1996 (JP) .................................................. 8-322171

(51) Int. Cl.⁷ ...................................................... H04N 9/31
(52) U.S. Cl. ........................... 348/744; 348/751; 348/757
(58) Field of Search .................... 348/750, 751, 348/756, 757, 761, 766, 779, 780, 781, 782, 744; 345/1, 3, 9, 30, 31, 32, 87, 104, 150, 151; 349/5, 8, 9, 80, 10; 353/31, 34, 78; H04N 9/31

(56) References Cited

U.S. PATENT DOCUMENTS

| | | |
|---|---|---|
| 4,368,963 | 1/1983 | Stolov . |
| 4,800,375 * | 1/1989 | Silverstein et al. .................. 340/703 |
| 5,150,206 * | 9/1992 | Roberts .................................. 358/30 |
| 5,321,448 * | 6/1994 | Ogawa .................................... 353/34 |
| 5,626,409 * | 5/1997 | Nakayama et al. .................... 353/31 |
| 5,692,819 * | 12/1997 | Mitsutake et al. ..................... 353/31 |
| 5,743,610 * | 4/1998 | Yajima et al. ......................... 353/31 |
| 5,786,874 * | 7/1998 | Kawamoto et al. ..................... 349/8 |
| 5,806,950 * | 9/1998 | Gale et al. .............................. 353/78 |
| 5,917,462 * | 6/1999 | Suzuki et al. ........................... 345/32 |
| 5,917,561 * | 6/1999 | Hatanaka ................................. 349/8 |

FOREIGN PATENT DOCUMENTS

| | | | |
|---|---|---|---|
| 0 367 848 | 5/1990 | (EP) . | |
| 0 676 903 | 10/1995 | (EP) . | |
| 2 282 928 | 4/1995 | (GB) . | |
| 95/10160 * | 4/1995 | (GB) | ............................... H04N/9/67 |
| 3-296030 * | 12/1991 | (JP) | ................................. H04N/9/31 |
| 7-043658 * | 2/1995 | (JP) | ................................. H04N/9/31 |

OTHER PUBLICATIONS

Patent Abstracts of Japan vol. 95, No. 5, Jun. 30, 1995 of JP 07 043658 A (Seiko), Feb. 14, 1995.

\* cited by examiner

*Primary Examiner*—Sherrie Hsia
(74) *Attorney, Agent, or Firm*—Frommer Lawrence & Haug, LLP.; William S. Frommer; Bruno Polito

(57) ABSTRACT

The projector apparatus comprises an image signal processor for generating color drive signals of at least four channels, which correspond to at least four kinds of colors including the colors selected according to the spectrum of the light source, from the three primary color image signals; a light-splitting device for splitting the light from the light source into at least four kinds of lights according to the colors corresponding to the color drive signals generated in the image signal processor; light valves, each of which comprises a liquid crystal element driven by the color drive signal for modulating each of the light splitted from that of the light source by the light-splitting device; and a combining device for combining each of components of light modulated by the light valves.

9 Claims, 5 Drawing Sheets

PROJECTOR APPARATUS

BACKGROUND OF THE INVENTION

The present invention relates to a projector apparatus comprising light valves.

In recent years, there are becoming widespread projection type projector apparatuses, each of which uses three TFT (Thin Film Transistor) liquid crystal display panels corresponding to the three primary colors of RGB (red, green and blue), (hereinafter referred to as a 3-plate projector apparatus). This projector apparatus projects images on a large screen hung on the wall or a semi-transparent screen such as a Fresnel lens to provide realistic images on the large screen appealing strongly to the watchers. This projector apparatus comprises an optical system and a driving control system of the optical system that are all housed in the apparatus. The light emitted from a light source of the optical system is splitted into RGB colors, then modulated by light valves, each of which comprises a liquid crystal panel, according to the drive signals generated by the driving control system, then combined again to form color images.

FIG. 1 is a schematic diagram illustrating an example of the optical system of such a projector apparatus.

The light W emitted from the light source 31 is incident on the dichroic mirror 32 to be splitted into red light R, green/blue light G/B, for which the light R is reflected and the light G/B is transmitted.

The light R splitted by reflecting on the dichroic mirror 32 is further reflected by the mirror 33, then modulated by the light valve LB11 that controls transmission of the red light and led to the dichroic mirror 34. The light G/B transmitted through the dichroic mirror 32 reaches the dichroic mirror 35, and is splitted into lights G and B. The light G splitted by reflecting on the dichroic mirror 35 is modulated in the light valve LB12 that controls transmission of green light, then led to the dichroic mirror 34 and reflected therefrom so as to be combined with the light R and led to the dichroic mirror 37 as a light R/G. In the meantime, the light B transmitted through the dichroic mirror 35 is modulated by the light valve LB13 that controls transmission of blue light, then reflected by the mirror 36 and led to the dichroic mirror 37.

The dichroic mirror 37 transmits the light R/B led from the dichroic mirror 34 and reflects the light B reflected from the mirror 36, so that the lights with those 3 colors are combined. The combined light RGB is enlarged through a projection lens 38 and projected on, for example, a screen hung on the wall.

The light source 31 used for the projector apparatus shown in FIG. 1 has emission characteristics with various spectral distributions depending on the lamp in use. Therefore, when selecting three chromaticity points meeting the EBU (Europe Broadcast Union) Standard for each of RGB for a light source having a spectral distribution, for example, as shown in FIG. 2, it becomes difficult to reproduce the color correctly because the green color purity is changed by the color (orange) represented by the spectrum peak generated around the wavelength of 590 nm.

To avoid this, there is an idea to cut this orange light to improve the color purity. In this case, however, the efficiency to use the light from the light source is lowered, causing the dynamic range to be narrowed to make the degree of whiteness become insufficient.

Conventionally, when priority is given to the color purity over others, the efficiency to use light is lowered. On the contrary, when the efficiency to use light is improved with the strong light generated around the wavelength of the green light being included in the green region or red region, the color purity must be sacrificed to some extent depending on the emission characteristics of the lamp used as the light source.

In order to solve such problems, the present invention provides a projector apparatus comprising a light source, an optical system comprising a dichroic mirror as a light-splitting device for splitting for the light emitted from the light source into lights with specified colors and light valves for carrying out optical modulation of the splitted lights; and a driving processing system for generating color drive signals for driving the light valves according to color image signals, wherein the driving processing system includes a drive signal generator for generating at least four channels of the color drive signals from color image signals of the three primary colors, each of the color drive signals corresponding to at least four kinds of colors including colors selected according to the spectrum of the light source, and the optical system includes the light-splitting device for splitting the light from the light source into at least four lights according to the colors corresponding to the color drive signals generated by the drive signal generator; light valves for carrying out optical modulation of the splitted lights, for which the light from the light source is splitted by the light-splitting device, according to the color drive signals; and a combining device for combining the lights modulated by the light valves.

According to the present invention, at least four color drive signals corresponding to the required chromatic points according to the light source spectral distribution are generated from inputted image signals, and four light valves to be driven by the color drive signals are provided. Thus, the fourth light valve is driven by the fourth color drive signal in addition to the three light valves driven by three kinds of color drive signals corresponding to the three primary colors of RGB, so that the efficiency to use the light source can be improved and the color reproduction range can be expanded significantly. Consequently, even when monitoring images of an ordinary image source, the image can be represented at points where both saturation and luminance on the luminance axis are higher than those of the projector apparatus of the related art.

Furthermore, more improved representation of luminance becomes possible with the constraint condition in generating four or more kinds of color drive signals, so that gradation can be much improved. Furthermore, image resolution can be improved by splitting luminance component effective for improving resolution and by providing four or more light valves. Furthermore, the present invention allows a portion where the efficiency to use the light is improved can be represented by at least 4 values, the peak luminance can be improved, as well as this peak luminance can be used to enable modulation.

DESCRIPTION OF THE PREFERRED EMBODIMENT

Hereunder, an embodiment of a projector apparatus of the present invention will be described. The embodiment will be explained in relation to a light source having the spectral distribution shown in FIG. 2.

Figure 3:
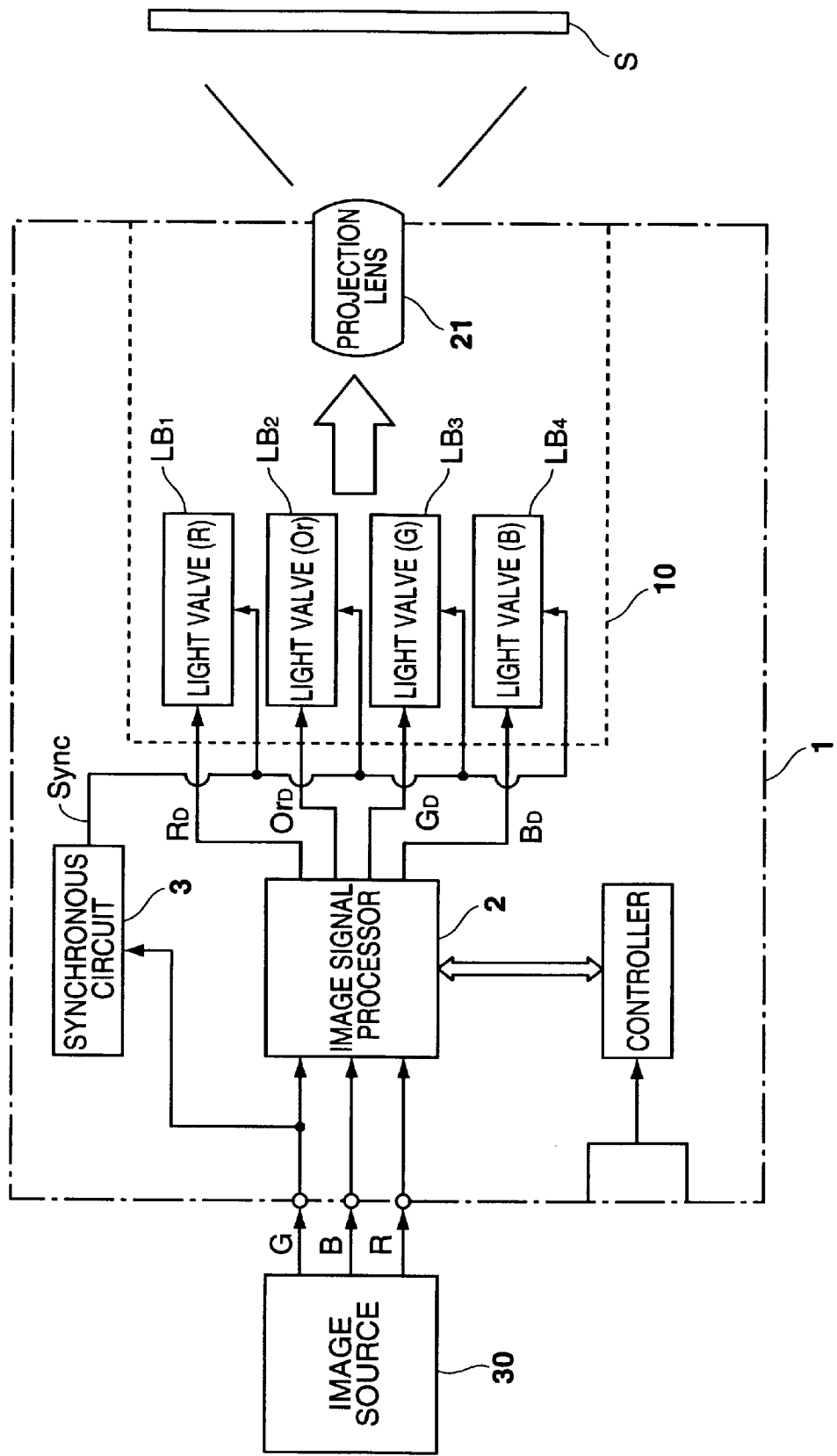
FIG. 3 is a block diagram showing a part of the projector apparatus circuitry in an embodiment of the present invention.

FIG. 3 is a block diagram showing a part of the circuitry of the projector apparatus in this embodiment.

The projector 1 is connected to a image source 30 such as a video deck or a TV tuner as an external input device. The projector 1 can output image signals supplied from this image source 30 onto a monitor. In this embodiment, the image source 30 is assumed to supply the RGB three primary color signals and the synchronous signal is assumed to be superposed on one of the three primary color signals, for example, the G signal. The synchronous signal may also be supplied via another route without being superposed on image signals. Furthermore, image signals may be inputted as video signals.

The RGB three primary color signals supplied from the image source 30 are supplied to the image signal processor 2. This image signal processor 2, as will be described later more in detail, generates and outputs drive signals $R_D$, $Or_D$, $G_D$, and $B_D$ corresponding to the four colors (e.g., red, orange, green, and blue) from the RGB three primary color signals in this embodiment. This is to effectively use the light source having a strong emission spectrum in the orange color region. The G signal is also supplied to the synchronous circuit 3 and synchronous signals (vertical and horizontal) Sync are separated there.

Drive signals generated in the image signal processor 2 are supplied to the optical system 10 shown with a broken line. In FIG. 3, only the light valves LB1 to LB4 and the projection lens 21 are illustrated in the optical system 10, but as explained later in FIG. 5, the optical system 10 comprises a light source and other various optical parts including dichroic mirrors. The light valves LB1 to LB4, each comprising a polarizing plate and a liquid crystal panel, are supplied with drive signals $R_D$, $Or_D$, $G_D$, and $B_D$, respectively, which are outputted from the image signal processor 2, and the synchronous signal Sync separated in the synchronous circuit 3. The lights once splitted into, for example, with four kinds of colors after being emitted from the light source are modulated by drive signals $R_D$, $Or_D$, $G_D$, and $B_D$, as well as by the synchronous signal Sync before they are outputted. The modulated lights are combined again and projected by the projection lens 21 on, for example, a screen S hung on the wall.

Figure 4:
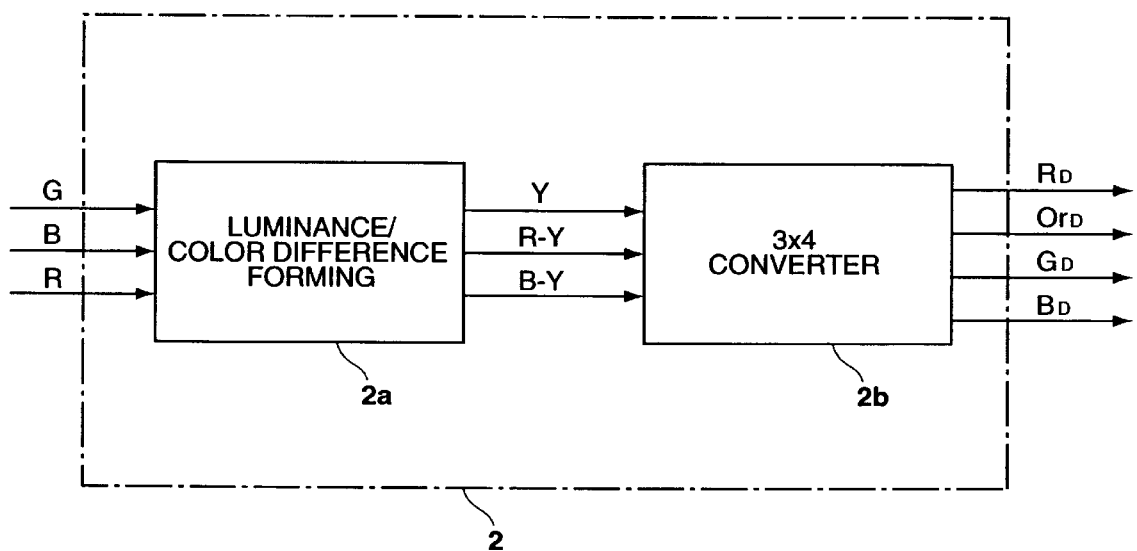
FIG. 4 is a block diagram showing the main part of the image signal processor in the embodiment.

FIG. 4 is a block diagram showing the main part of the image signal processor 2 of the present invention.

Color signals inputted from the image source 30, for example, the RGB three primary color signals, are supplied to the luminance/color difference signal generator 2a which executes processing of the supplied signals by specified add operations to find the luminance signal Y, and further find the color difference signals R-Y and B-Y and outputs those found signals. The luminance signal Y and the color difference signals R-Y and B-Y are then supplied to the four color converter 2b, so that drive signals $R_D$, $Or_D$, $G_D$, and $B_D$ are generated for four colors of RGB and orange in this example, respectively.

The conversion processing in the four color converter 2b is executed to enable color information defined by input signals on three channels to be defined by output signals on four channels (4-color). The conversion will therefore result in simply producing infinite number of solutions. To avoid this, any one of the four output colors must be constrained. Then, in this embodiment, the luminance signal Y, which is achromatic, is constrained so that the orange color drive signal $Or_D$ is determined by 3×4 conversion. When the luminance signal Y is thus constrained, the orange color drive signal $Or_D$ is obtained with the following expressions.

$Y = aR + bG + cB$ $Or_D = pY - q$ $R_D = R - rO_{rD}$ $G_D = G - sO_{rD}$ $B_D = B - tO_{rD}$ where a, b, c, p, r, s, and t are coefficients and q is a constant. Values of these coefficients are set to those providing the best color reproduction according to the spectral distribution of the light source or through experiment.

A conversion processing can also be executed so as to generally extend the chromaticity by regarding color reproducibility as important, in which, for example, color difference signal (R-Y) or (B-Y) is constrained to give importance to hue components.

A matrix algebra like conversion processing may also be executed by giving importance to the linearity without using any constraining condition, or a conversion processing may be executed using a lookup table for which non-linear part is taken into consideration.

Figure 5:
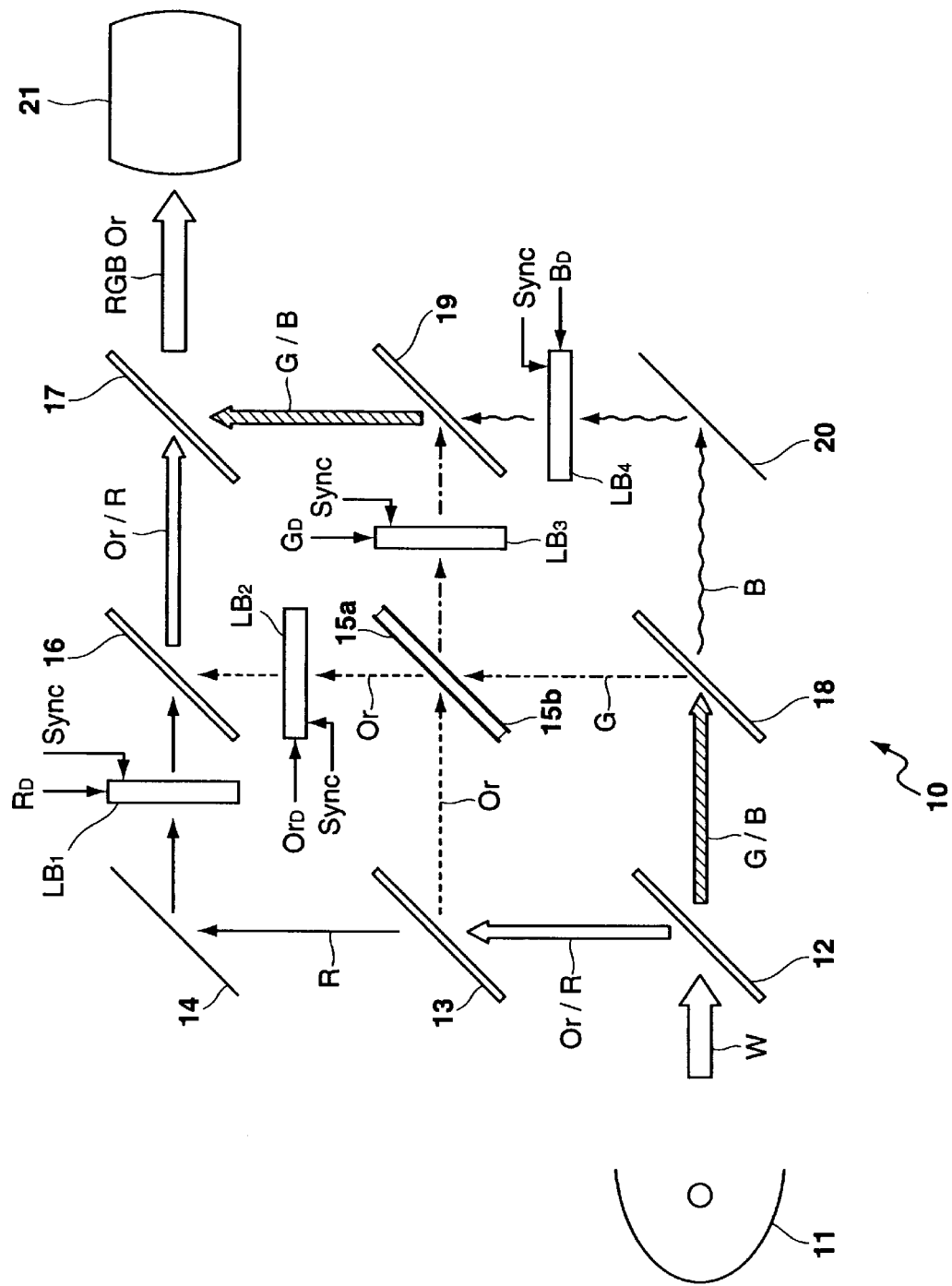
FIG. 5 is a schematic diagram illustrating the optical system in the embodiment.

Hereunder, with reference to FIG. 5, a configuration of the optical system 10 will be described which is driven by the four drive signals $R_D$, $Or_D$, $G_D$, and $B_D$ generated by the image signal processor 2.

The light W emitted from the light source 11 is incident on the dichroic mirror 12 and splitted so that the light Or/R in the orange/red region is reflected and the light G/B in the green/blue region is transmitted.

Figure 1:
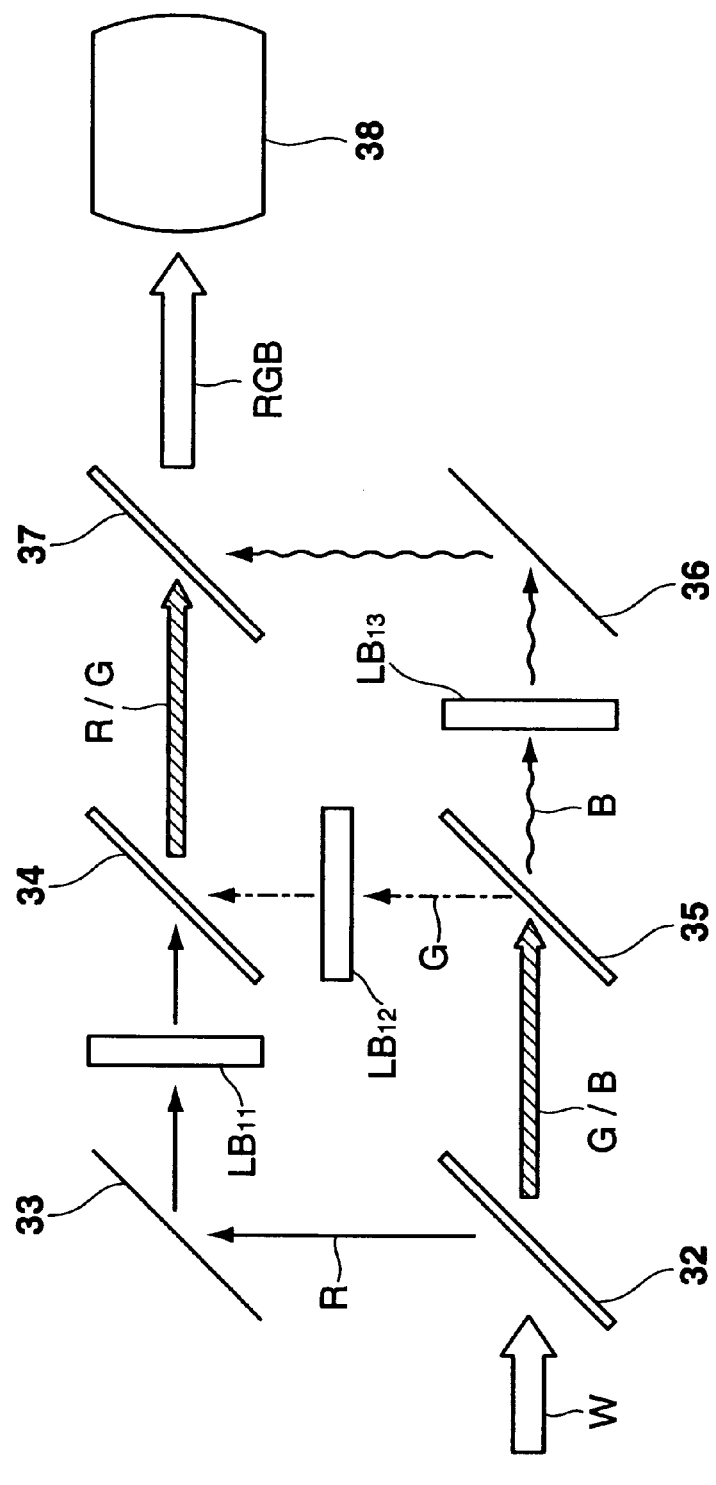
FIG. 1 is a schematic diagram illustrating an optical system used for a related art projecting apparatus.
Figure 2:
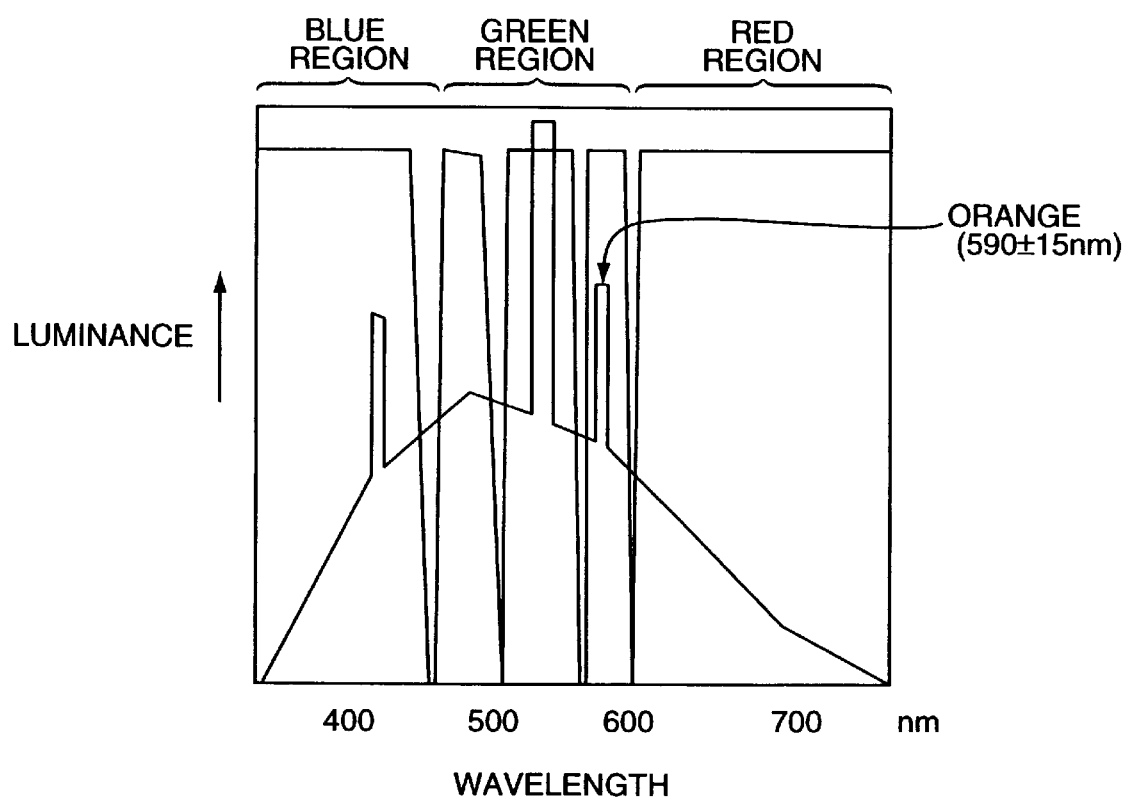
FIG. 2 is an illustration showing an example of the spectral distribution of a light source.

The orange light Or represents the light with a peak at the wavelength of 590±15 nm emitted when using the light source 11 having the emission characteristics shown in FIG. 2. The wavelength of the peak changes according to the emission characteristics of the lamp in use.

The light Or/R splitted by the dichroic mirror 12 is led to the dichroic mirror 13 and further splitted there into the light R in the red region and the light Or in the orange region with the light R being transmitted and the light Or being reflected. The light R is reflected by the mirror 14 and modulated by the light valve LB1 for red color, then led to the dichroic mirror 16. The light Or, after being reflected by the dichroic mirror 13, is reflected again by the mirror 15a and modulated by the light valve LB2 for orange color. The modulated light Or is led to the dichroic mirror 16.

The dichroic mirror 16 is formed to transmit the light R in the red region and reflect the light Or in the orange region, so that the modulated light R and Or are allowed to be combined there and the combined light Or/R is led to the dichroic mirror 17.

In the meantime, the light G/B that has been transmitted the dichroic mirror 12 reaches the dichroic mirror 18 and is splitted into with the light G in the green region and the light B in the blue region with the light G being reflected and the light B being allowed to be transmitted. Then, the light G is further reflected by the mirror 15b, modulated by the light valve LB3 for green color, and then led to the dichroic mirror 19. The light B, after being transmitted through the dichroic mirror 13, is reflected by the mirror 20, then modulated by the light valve LB4 for blue color. The modulated light B then reaches the dichroic mirror 19.

The dichroic mirror 19 is formed to reflect the light G in the green region and transmit the light B in the blue region, so that the modulated lights G and B are combined and the combined light G/B is led to the dichroic mirror 17.

The dichroic mirror 17 is formed to transmit the light Or/R and reflect the light G/B, so that all of the modulated lights with respective colors are combined to generate a full-colored light RGBOr according to the input image signals. This full-colored light flux RGBOr is expanded and projected on a screen S (not illustrated) by the projection lens 21.

Resolution of the image can be improved by subtly changing the positions of the light valves LB1 to LB4 to subtly shift the four spectral components. When trying to improve the resolution with lights of only three colors, remarkable color shifts appear at edges. In contrast with this, use of lights with four or more colors as in the present invention can reduce such color shifts with some way of combining the lights and improve the resolution to obtain clear images.

As described above, according to the present invention, four or more driving signals are generated for four or more colors according to input RGB three primary colors by taking redundancies of luminance and hue into consideration. This enables reproduction of chromaticity points with high luminance and high saturation, which have been impossible in the related art, as well as expansion of the color reproduction range and fine representation within the color reproduction range with improvement in the gradation, resolution, and peak luminance of images.

In this embodiment, an example is explained in which, for example, four drive signals corresponding to four kinds of colors are generated from the RGB three primary color signals to drive the four light valves. However, the number of drive signals and the light valves may be four or more, because the number of these items may be increased according to the spectral distribution of the light source when the efficiency in using light is increased.

What is claimed is:

1. A projector apparatus, comprising:
   a light source;
   a driving processing system including drive signal generating means for generating at least four color drive signals according to color image signals of at least red, green and blue primary colors, said color drive signals respectively corresponding to at least a red color, a blue color, a green color and a color corresponding to the spectrum emitted by said light source, wherein said color corresponding to the spectrum emitted by said light source has a wavelength of 590+/−15 nm; and
   an optical system including light splitting means for splitting the light from said light source into at least four light beams according to the colors corresponding to said color drive signals, at least four light valves for respectively carrying out optical modulation of said at least four light beams according to said color drive signals to generate at least four modulated light beams, and combining means for combing said modulated light beams.

2. The projector apparatus of claim 1, wherein at least one of said color drive signals is generated according to a luminance signal and a color difference signal of said color image signals.

3. The projector apparatus of claim 1, wherein said drive signal generating means generates said color drive signals using a luminance signal of said color image signals as a condition of constraint.

4. The projector apparatus of claim 1, wherein said drive signal generating means generates said color drive signals using a color difference signal of said color image signals as a condition of constraint.

5. The projector apparatus of claim 1, wherein said drive signal generating means generates said color drive signals by carrying out a matrix algebra conversion process emphasizing linearity.

6. The projector apparatus of claim 1, wherein said drive signal generating means generates said color drive signals by carrying out conversion processing of signals using look-up tables in which non-linearity is taken into consideration.

7. The projector apparatus of claim 1, wherein each of said light valves comprises a polarizing plate and a liquid crystal panel.

8. The projector apparatus of claim 1, wherein said light splitting means comprises a dichroic mirror.

9. The projector apparatus of claim 1, wherein said combing means comprises a dichroic mirror.

* * * * *